April 2, 1968     E. SNITZER     3,376,421

QUANTUM COUNTERS

Filed Feb. 2, 1965     4 Sheets-Sheet 1

INVENTOR.
ELIAS SNITZER

BY *J. Albert Hultquist*

ATTORNEY

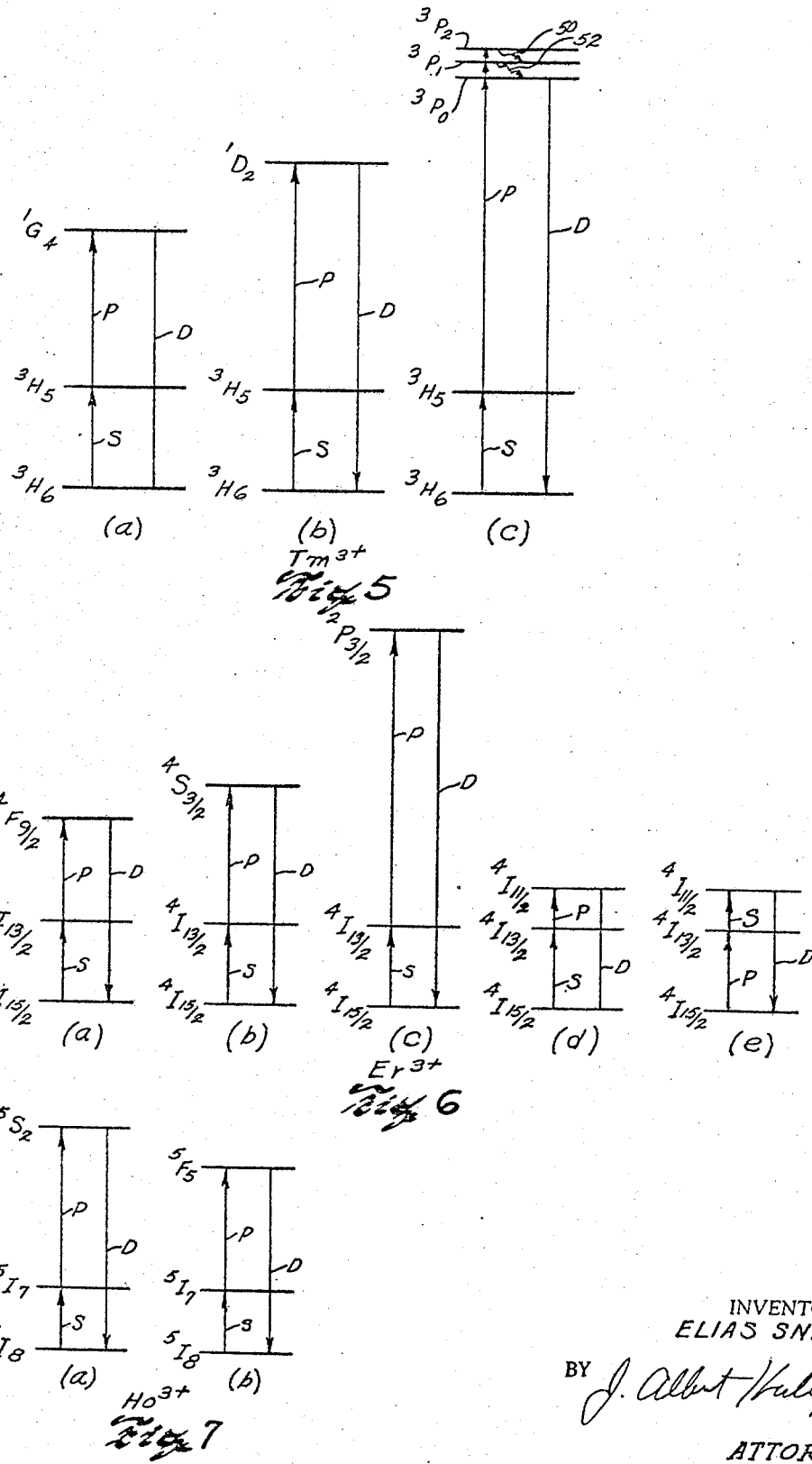

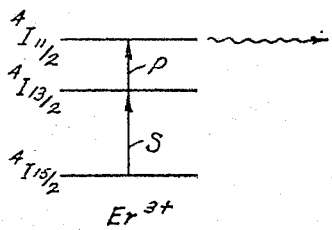
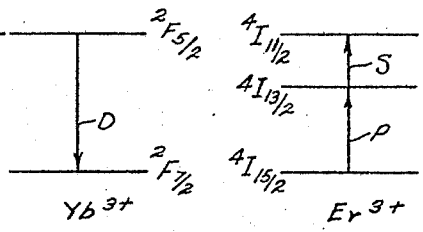
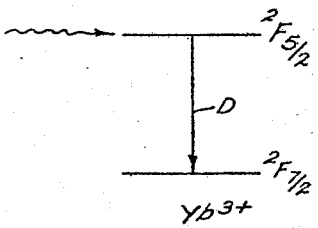
(a)                  (b)
Fig. 8
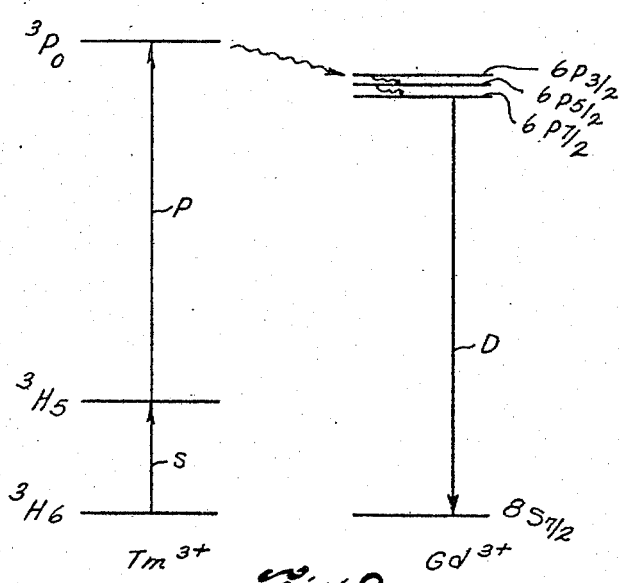
Fig. 9
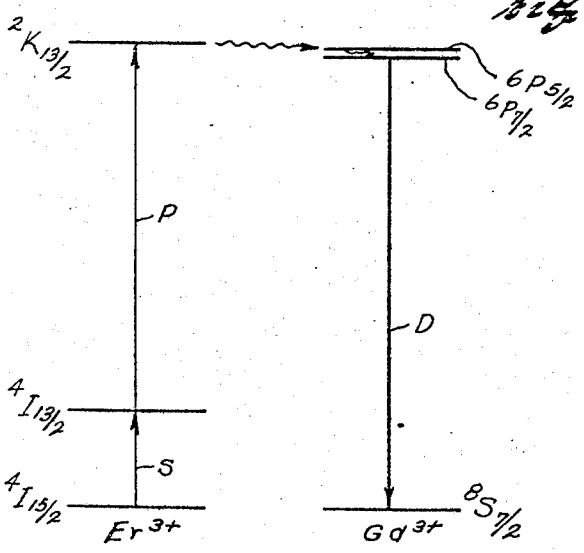
Fig. 10
INVENTOR.
ELIAS SNITZER
BY J. Albert Kaltquist
ATTORNEY April 2, 1968   E. SNITZER   3,376,421
QUANTUM COUNTERS Filed Feb. 2, 1965   4 Sheets-Sheet 1

INVENTOR.
ELIAS SNITZER
BY J. Albert Hiltquist
ATTORNEY

United States Patent Office 3,376,421
Patented Apr. 2, 1968

3,376,421
QUANTUM COUNTERS
Elias Snitzer, Sturbridge, Mass., assignor to American
Optical Company, Southbridge, Mass., a voluntary association of Massachusetts
Filed Feb. 2, 1965, Ser. No. 429,707
29 Claims. (Cl. 250—83.3)

ABSTRACT OF THE DISCLOSURE

This invention contemplates a fiber optic device having a bundle of a number of cores of glass of one index of refraction doped with a rare earth fluorescent ion and each core being surrounded by a cladding of a lower index of refraction. An infrared image is applied to one end of the fiber optic bundle and pumping radiation is also applied to the fiber optic bundle with the result that at the output end of the fiber optic bundle a visible image is produced. A filter may be provided to separate the infrared image and the pumping radiation from the visible image which then can be viewed or it can be applied to an image intensifying tube for further amplification.

---

This invention relates generally to the field of quantum counters and more specifically to quantum counters functioning as image converters for signals in the infra-red region of the spectrum.

At the present time, image-intensifiers having a photo-emissive material for emitting electrons are used for obtaining an image of a signal in the visible region of the spectrum. The emitted electrons are accelerated to strike a photo-cathode with an enhanced emission of light. Near infra-red image converters (out to about 1.2 microns) also rely on photo-emission, which takes place from a photo-cathode (S–1) surface, the emitted electrons being accelerated sufficiently to cause the phosphor on the collecting screen to fluoresce in the visible region of the spectrum. However, beyond 1.2 microns, there are no photo-emissive materials and, therefore, other means are necessary for image converting or detecting.

Such other methods for converting an input beyond about 1.2 microns to obtain a visible image most often make use of a photo-conductive cell in a scanning system, wherein the intensity of the image is scanned in a manner similar to that involved in the scanning operation for a television tube. However, this approach is involved and cumbersome because it requires constructing the image after scanning each image point. An extension of the scanning approach in the infra-red region is to use several scanning detectors, but such methods are even more involved. Another approach for inputs beyond 1.0 micron makes use of picture-producing thermal processes, which depend on the heat image for producing a permanent or semi-permanent record of the input signal. However, these thermal schemes present difficulties since they do not follow the image as fast as the eye can follow it, which has been found to be on the order of .01 second.

Accordingly, it is the object of the present invention to provide a simplified quantum counter for detection in the infra-red region from approximately 1.0 to 2.8 microns and for converting such an input to an image in the wavelength spectrum below approximately 1.2 microns.

These and other objects are accomplished in one illustrative embodiment of the invention wherein rare earth ions are used in glass in the form of fibers and a pumping source is provided to correspond to the wavelength difference (related to the energy level difference) between the second and third levels of the system. The input signal corresponds to the first and second energy level difference, so that the energy level population necessary for detectable fluorescence from the third level is not established without the presence of an input signal. The detected photon from the fibers is thereby emitted in a wavelength region in the visible part of the spectrum and is filtered to contain only the representation of the input without the pumping light for image intensification and the desired output.

Other objects, features and embodiments of the invention will become apparent by the following more detailed description and reference to the accompanying drawings wherein:

FIGS. 5a–5c are diagrammatic representations of the energy levels of trivalent thulium useful as a rare earth material for inclusion in the glass of the fibers in the apparatus of the present invention, with three different sets of high energy levels shown;

FIGS. 6a–6e are diagrammatic representations of the energy levels for trivalent erbium useful for operation according to the present invention;

FIGS. 7a and 7b are diagrammatic representations of the energy levels for trivalent holmium with two different higher levels being shown for operation according to the present invention;

FIGS. 8a and 8b are diagrammatic representations of two different energy level systems using energy transfer between trivalent erbium and trivalent ytterbium;

FIG. 9 is a diagrammatic representation of the energy levels for an energy transfer scheme using trivalent thulium and trivalent gadolinium;

FIG. 10 is a diagrammatic representation of an energy level system useful in the present invention with energy transfer taking place from trivalent erbium to trivalent gadolinium;

Figure 1:
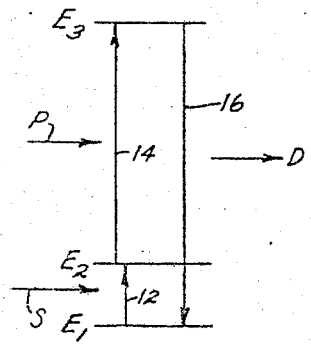
FIG. 1 is a diagrammatic representation of a general energy level scheme for obtaining the desired population inversion for fluorescence in the visible region of the spectrum representative of an input in the infra-red region.

Referring first to FIG. 1, a general diagrammatic representation of the energy levels for the quantum counter of the present invention is shown. Signal photons S, according to one embodiment of the invention, are in the infra-red region of the spectrum in the range of approximately 1.0 to 2.8 microns. Pump photons P are in the infra-red, visible, or ultra-violet region of the spectrum. The signal photons raise the ions from an initial ground level $E_1$ along arrow 12 to a level $E_2$ slightly above the ground level. While level $E_2$ is populated, the presence of pumping photons will raise the ions from level $E_2$ to the high energy level $E_3$, as indicated by arrow 14. Subsequent fluorescence occurs in the transition between levels $E_3$ and $E_1$ as represented by arrow 16. Arrow D indicates photons emitted as a result of such fluorescence. It may be seen that, by use of such a system, since fluorescence can be caused to occur in a region to which photo-emissive cells are responsive, the emitted photon D is detectable by a photo-multiplier tube or another high-sensitivity detector. The noise in a device using such an energy scheme is virtually negligible since the high energy level $E_3$ is not populated unless the signal S causes level $E_2$ to be populated. In other words, if the signal S is not present to populate level $E_2$, the pump photon P will have no ions to raise to the energy level $E_3$ for subsequent fluorescence.

Concentration of the rare earths is a consideration in a system using the energy levels of FIG. 1 since a large number of ions are needed in the device in order to absorb most of the incident signal light, and yet the concentration cannot be made too high because of the attendant possibility of concentration quenching of fluorescence. In order to obtain the large number of ions needed to absorb most of the incident light and, at the same time avoid the quenching, the active material is preferably formed into a device so as to provide a relatively large path length for the incident light. To provide the large path lengths, but at the same time to avoid a loss in resolution which is caused by the use of large crystals, the quantum counter device is made of fiber optics, either in the form of a coherent fiber bundle or as a fused bundle or face plate.

Another consideration to be met by the quantum counter using the energy level system of FIG. 1 is that efficiency requires that the radiative transitions involving the levels $E_3$ and $E_2$ be large compared with the non-radiative processes involving those levels. Therefore, such a consideration requires that the ions used should have at least two levels from which fluorescence occurs with a relatively high quantum efficiency. The minimum requirement of two levels from which fluorescence occurs is readily obtained only for chloride and fluoride crystals. These crystals tend to have a probability for non-radiative transitions that is less than would be the case for oxides. The photon spectrum for vitreous and crystalline materials of similar compositions are comparable to one another, so that fluorescence in two excited states can be obtained with fluoride and oxi-fluoride glasses doped with certain rare earths. The use of glass is preferred but crystals, plastics and hollow fibers filled with appropriate liquids are also useful in a fiber quantum counter. A further embodiment of a quantum counter that avoids the requirement of efficient fluorescence from two excited states uses energy transfer between different ions in the same host glass.

Figure 2:
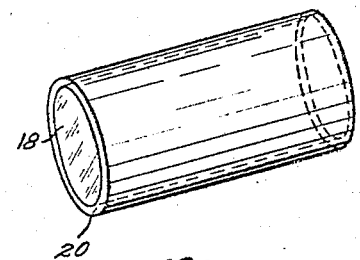
FIG. 2 is a perspective view of a glass fiber useful for containing the rare earth material in glass for performance according to FIG. 1.

FIG. 2 represents a perspective view of a single fiber device having a core 18 of glass doped with a rare earth material suitable for use in the present invention. The fiber has a cladding 20 of an index of refraction lower than that of the core 18. (Of course, the environment of the core may be used as its cladding.) In this way, light propagated through the fiber will tend to be bent towards the axis of the fiber when incident on the junction between the core 18 and the cladding 20. The fiber, therefore, is an efficient "light pipe" with minimum losses along its length and a concomitant efficient transfer of light from one of its ends to the other.

Figure 3:
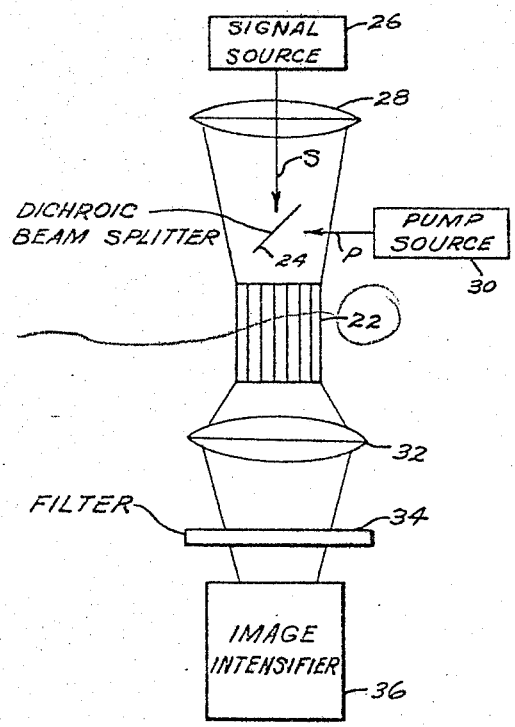
FIG. 3 is a schematic representation of a system employing a bundle of fibers, such as the one shown in FIG. 2, with appropriate lenses, a filter, and an image-intensifier to perform the conversion operation.

An apparatus using a face plate or fiber bundle 22, made up of a number of fibers such as that shown in FIG. 2, is shown in FIG. 3 for receiving the signal photon S and a pump photon P, which impinge on a dichroic beam splitter 24. The fibers are assembled in a side-by-side parallel array with all of their one ends forming a signal receiving face and the other ends, an emitting face. The signal source 26 (a scene) emits a signal in the infra-red region of the spectrum between approximately 1.0 and 2.8 microns through a lens 28 (any of the common lens materials are useful in this system), which focuses the signal to the input end of the fiber bundle or face plate 22. The pump photon P is emitted by a pump source 30 which may be a xenon, or a mercury discharge lamp or a laser. Dichroic beam splitter 24 is so constituted as to totally transmit the signal photon and totally reflect the pump photon into the input end of fiber bundle 22. The detector photons emitted from the output end of bundle 22 are focused by lens 32 through a filter 34 and applied to the input end of image-intensifier 36. The image-intensifier may be the same or similar to the one shown in United States Patent No. 3,141,105 for Cathode Ray Tube With Composite Multiple Glass Fiber Face, by J. S. Courtney-Pratt, filed Aug. 26, 1957, and issued July 14, 1964. Filter 34 is used to transmit the detected fluorescence and reflect the pumping energy, so that the image-intensifier 36 receives only the detected wavelength for excitation of its photo-cathode to produce an intensified image in the visible region of the wavelength spectrum.

Figure 4:
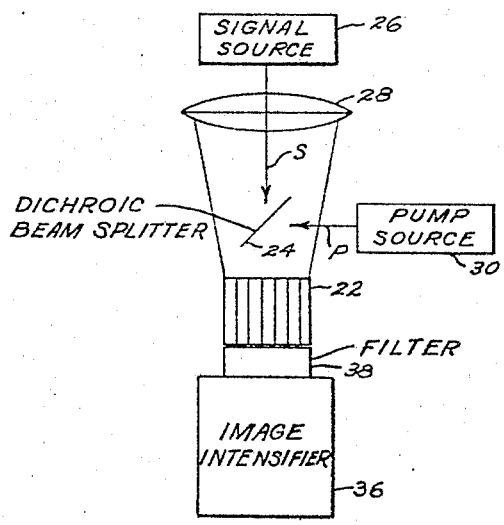
FIG. 4 is a schematic of a simplified version of the apparatus of FIG. 3 for a more compact embodiment of the present invention.

FIG. 4 depicts a simplified and more compact version of the apparatus of FIG. 3 wherein the filter 34 and the lens 32 of that figure are eliminated. The signal photon and pump photon are transmitted by means of the lens 28 and the dichroic beam splitter 24 to the fiber bundle 22, which is in contact at its output end with a filter 38 for separation of the pump and detector wavelengths. The detector photons are then applied to the input end of image-intensifier 36 to produce an image in the visible region of the wavelength spectrum. In this case, it will be preferred to use a fiber optics coupling arrangement, directly carrying the photo-emissive cathode, such as described in United States Patent No. 3,141,105 for Cathode Ray Tube With Composite Multiple Glass Fiber Face, by J. S. Courtney-Pratt, filed Aug. 26, 1957, and issued July 14, 1964, for the second and following stages.

FIGS. 5a through 12b represent the energy level diagrams for the various rare earths and combinations of rare earths in energy transfer schemes that are useful for doping the base glasses or other base materials useful in laser or fiber devices. Such bases include silicate glass, borate glass, etc., whose specific constituents and weight percentages are well known to one skilled in the glass and glass physics field.

FIGS. 5a through 5c represent energy level schemes for trivalent thulium ($Tm^{3+}$), which are useful in the present invention. The criteria for utility of the various energy schemes in this and the subsequent drawings are that the signal photon wavelength corresponds to an energy difference that represents the infra-red region of the spectrum from approximately 1.0 to 2.8 microns and that the detector photon wavelength corresponds to an energy level difference that represents the visible and near-visible region of the spectrum up to about 1.2 microns for exciting a photo-emissive material. In FIG. 5a, the energy level separation for the signal photon S represents a wavelength of approximately 1.75 microns and the energy level difference for the pump photon represents a wavelength of approximately .67 micron. In spectroscopic notation, the ground level is $^3H_6$ and the level slightly above ground is the $^3H_5$ level with the high energy level being the $^1G_4$ level. The schemes represented in FIGS. 5b and 5c use the same ground level and the level slightly above ground but a different high energy level for thulium. In FIG. 5b the $^1D_2$ level is used and in FIG. 5c, either of the levels $^3P_2$, $^3P_1$, or $^3P_0$ are used. By way of explanation, the wavy arrows 50 and 52 in FIG. 5c represent non-radiative transitions which occur if ions are pumped to either of the upper two levels represented in that figure. The pump photon wavelength in FIG. 5b is .46 micron and the detector photon wavelength is .37 micron. In FIG. 5c, the pump photon wavelength to the $^3P_0$ level is .34 micron and the detector photon wavelength is .28 micron.

FIGS. 6a through 6d represent the energy level diagrams for trivalent erbium ($Er^{3+}$) that are useful in the present invention with the ground energy level being the $^4I_{15/2}$ level and the intermediate level being the $^4I_{13/2}$ level, the difference between those levels representing the wavelength for the signal photon of 1.5 microns. The higher energy level for FIGS. 6a through 6d are, respectively, the $^4F_{9/2}$ level, the $^4S_{3/2}$ level, the $^2P_{3/2}$ level and the $^4I_{11/2}$ level. The pump photon wavelength in FIG. 6a is, therefore, 1.2 microns with the detector photon wavelength being .67 micron; the pump photon wavelength for FIG. 6b is .84 micron and its detector photon wavelength is .54 micron; in FIG. 6c, the pump photon wavelength is .40 micron and the detector photon wavelength is .32 micron; and the pump photon wavelength is 1.5 microns and the detector photon wavelength is 1.0 micron in the energy level diagram of FIG. 6d. The energy level diagram of FIG. 6e is the same as that for FIG. 6d, except that the signal and pump photon are reversed. This reversal is made possible by the fact that both the signal and pump photon wavelengths are in the infra-red region of the spectrum within the range of 1.0 through 2.8 microns, which is the useful region for the objects of the present invention.

FIGS. 7a and 7b are energy level diagrams for the rare earth trivalent holmium ($Ho^{3+}$) using a ground level of $^5I_8$ and a level slightly above ground of $^5I_7$, representing a wavelength of 2.5 microns. The high level $^5S_2$ is used in FIG. 7a to accept a pump photon wavelength of .76 micron, with the detector photon wavelength for the figure being .55 micron. The high energy level for FIG. 7b is the $^5F_5$ level with the pump photon wavelength being 1.0 micron and the detector photon wavelength being .65 micron.

When using either of the rare earths, trivalent thulium, trivalent erbium or trivalent holmium as represented in FIGS. 5a through 7b, their concentrations in relation to the total fiber glass core composition should be in the range of .01 through 5 weight percent to satisfy the concentration criteria discussed previously in this specification.

The various energy transfer schemes for use in the present invention are represented in FIGS. 8a through 12b. In FIG. 8a, the pump ion trivalent erbium, ($Er^{3+}$) is used for energy transfer to the activator ion trivalent ytterbium ($Yb^{3+}$). The levels for erbium are the same as those described with reference to FIG 6d, with the corresponding wavelengths being the same also. However, the fluorescence is prevented from occurring in the erbium ion by causing an energy transfer from the high level $^4I_{11/2}$ level of erbium to the $^2F_{5/2}$ level of ytterbium by using a concentration of .01 to 5 weight percent of the erbium ion and a concentration of 1 to 30 weight percent of the ytterbium ion. The detector photon wavelength for erbium is then 1.0 micron with the fluorescence of that detector photon taking place between $^2F_{5/2}$ to the $^2F_{7/2}$ level. The scheme represented by the energy level diagrams of FIG. 8b are the same as that for FIG. 8a, except that the signal photon and the pump photon are reversed insofar as the energy levels between which they are pumped are concerned.

FIG. 9a represents an energy transfer scheme between the trivalent ions of thulium ($Tm^{3+}$) and gadolinium ($Gd^{3+}$). The signal photon of wavelength 1.75 microns pumps ions from the $^3H_6$ level to the $^3H_5$ level of thulium. The pump photon of wavelength .34 micron then raises the ions ot the higher $^3P_0$ level of thulium, from which a non-radiative energy transfer takes place to the $^6P_{3/2}$ level of gadolinium. Non-radiative transitions then take place, respectively, to the $^6P_{5/2}$ and the $^6P_{7/2}$ levels of gadolinium, with the detector photon of wavelength of .31 micron causing a fluorescent transition to the ground $^8S_{7/2}$ level. Concentrations for the FIG. 9 scheme for thulium and gadolinium, respectively, are .01 to 5 weight percent and 1 to 30 weight percent.

FIG. 10 represents an energy transfer scheme between the trivalent ions of erbium ($Er^{3+}$) and gadolinium ($Gd^{3+}$) in concentrations, respectively, of .01 to 5 weight percent and 1 to 30 weight percent. The signal photon of wavelength 1.5 microns raises the erbium ion from a ground $^4I_{15/2}$ level to the $^4I_{13/2}$ level. The pump photon of wavelength .38 micron then raises the ions to a high $^2K_{13/2}$ level, from which energy transfer takes place to the $^6P_{5/2}$ level, of gadolinium. A non-radiative transition then takes place to the $^6P_{7/2}$ level, from which the detector photon of .31 micron causes fluorescence by a transition to the ground level $^8S_{7/2}$ level.

Figure 11:
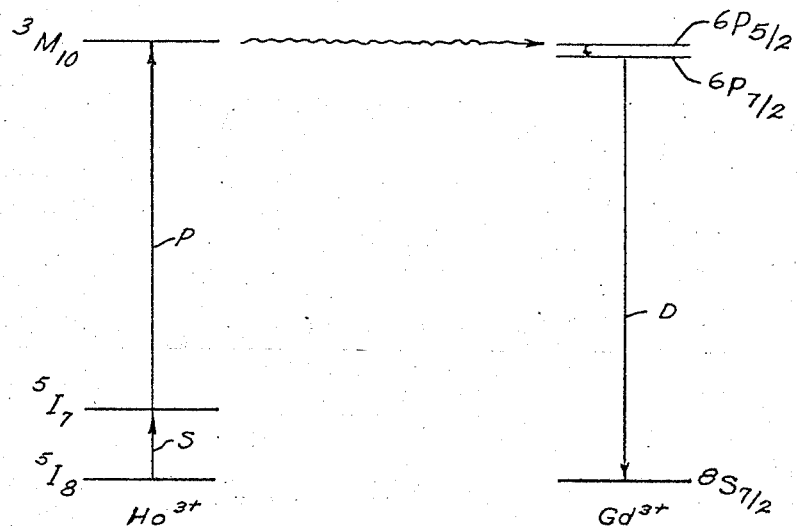
FIG. 11 is a diagrammatic representation of an energy transfer scheme using trivalent holmium and trivalent gadolinium as materials for inclusion in the glass of the fibers of the present invention; and, FIGS. 12a and 12b are diagrammatic representations of two energy transfer schemes using trivalent erbium and trivalent europium.

Since trivalent holmium ($Ho^{3+}$) has an infra-red absorbing ion, it is used in the present invention, as shown by FIG. 11, for energy transfer to the trivalent gadolinium ion ($Gd^{3+}$). The signal photon S of wavelength 2.5 microns raises the holmium ion from ground level $^5I_8$ to the level $^5I_7$. The pump photon of wavelength .36 micron then raises the ion to the $^3M_{10}$ level, from which energy transfer takes place to the $^6P_{5/2}$ level of gadolinium. A non-radiative transition then occurs to the $^6P_{7/2}$ level, from which the detector photon causes a fluorescent transition to the ground level $^8S_{7/2}$ of gadolinium. The detector photon wavelength for the scheme of FIG. 11 is .31 micron and the concentrations recommended for holmium and gadolinium, respectively, are .01 to 5 weight percent and 1 to 30 weight percent.

Figure 12A:
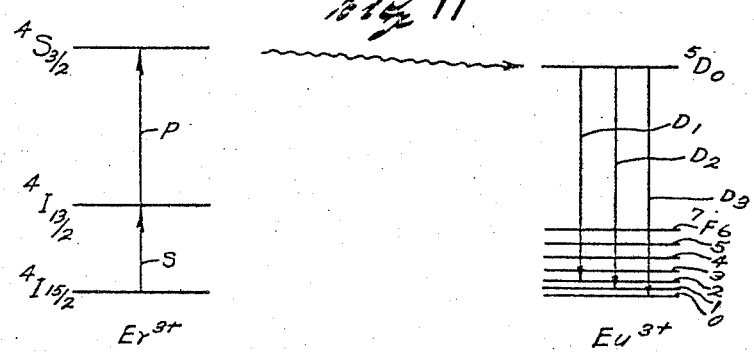
Figure 12B:
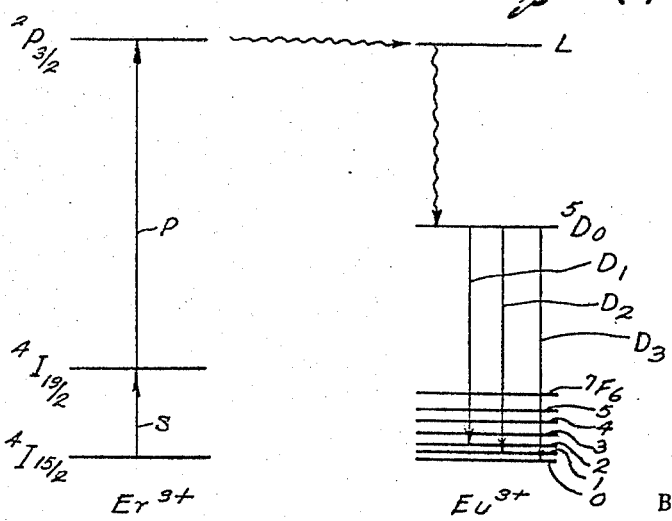

FIG. 12a represents an energy transfer scheme for trivalent erbium ($Er^{3+}$) and trivalent europium ($Eu^{3+}$) in concentrations, respectively, of .01 to 5 weight percent and 1 to 30 weight percent, which are the concentrations also recommended for the scheme represented in FIG. 12b. The signal photon of FIG. 12a, having a wavelength of 1.5 microns, raises the erbium ion from its ground level $^4I_{15/2}$ to level $^4I_{13/2}$, from which the ump photon of .85 micron raises it to the high energy level $^4S_{3/2}$. An energy transfer then takes place to the $^5D_0$ level of europium. The detector photon of wavelength .55 micron causes fluorescence by energy transitions as represented by arrow $D_1$ to the level $^7F_2$. Fluorescence also takes place, as represented by arrows $D_2$ and $D_3$, to levels $^7F_1$, and $^7F_0$, respectively.

In the scheme of FIG. 12b, the signal and detector wavelengths are the same as that for FIG. 12a but the pump photon has a wavelength of .40 micron, since the high level of erbium used is the $^2P_{3/2}$ level, from which energy transfer takes place to the L level of europium. A non-radiative transition is then caused to the $^5D_0$ level of europium, from which fluorescence of wavelength .55 micron takes place to level $^7F_2$.

I claim:
1. A quantum counter for use in detecting an infra-red input signal and converting the signal to a representation in the region of the wavelength spectrum below approximately 1.2 microns, comprising:
   a source of pumping radiation;
   a fiber optic device including a bundle of thin elongated glass cores arranged in side-by-side parallel arrangement and each having one index of refraction and doped with an ion that fluoresces in the region of the wavelength spectrum below approximately 1.2 microns in response to the infra-red signal and said pumping radiation; said cores each being surrounded by a cladding of glass of a lower index of refraction; and
   means for applying the infra-red signal to one end of said cores and means for applying said pumping radiation to said fiber optic device.

2. A quantum counter for use in detecting an infra-red input signal and converting the signal to a representation in the region of the wavelength spectrum below approximately 1.2 microns, comprising:
   a source of pumping radiation;
   a fiber optic device including a number of thin elongated glass cores each having one index of refraction and doped with a rare earth ion having a ground energy level, an intermediate energy level and at least one higher useful energy level, said cores each being surrounded by a cladding of glass of a lower index of refraction, said energy level characteristics being such that the input signal corresponds to an energy level difference of said rare earth ion, and the wavelength of said pumping radiation corresponds to another energy level difference of said rare earth ion; and, means for applying said input signal to one end of said cores and means for applying said pumping radiation to said fiber optic device to raise said ion to said higher useful energy level, so that said ions make a transition to a lower level and fluoresce in a region of the wavelength spectrum below approximately 1.2 microns.

3. The invention according to claim 2 wherein said rare earth ion is trivalent thulium, whose intermediate and ground levels, in spectroscopic notation, are the $^3H_5$ level and the $^3H_6$ level, respectively.

4. The invention according to claim 3 wherein the higher useful energy level of said trivalent thulium is the $^1G_4$ level, in spectroscopic notation.

5. The invention according to claim 3 wherein the higher useful energy level of said trivalent thulium is the $^1D_2$ level, in spectroscopic notation.

6. The invention according to claim 3 wherein the higher useful energy level of said trivalent thulium is the $^3P_2$ level, in spectroscopic notation.

7. The invention according to claim 3 wherein the higher useful energy level of said trivalent thulium is the $^3P_1$ level, in spectroscopic notation.

8. The invention according to claim 3 wherein the higher useful energy level of said trivalent thulium is the $^3P_0$ level, in spectroscopic notation.

9. The invention according to claim 2 wherein said rare earth ion is trivalent erbium, whose intermediate and ground levels, in spectroscopic notation, are the $^4I_{13/2}$ level and the $^4I_{15/2}$ level, respectively.

10. The invention according to claim 9 wherein the higher useful energy level of said trivalent erbium is the $^4F_{9/2}$ level, in spectroscopic notation.

11. The invention according to claim 9 wherein the higher useful energy level of said trivalent erbium is the $^4S_{3/2}$ level, in spectroscopic notation.

12. The invention according to claim 9 wherein the higher useful energy level of said trivalent erbium is the $^2P_{3/2}$ level, in spectroscopic notation.

13. The invention according to claim 9 wherein the higher useful energy level of said trivalent erbium is the $^4I_{11/2}$ level, in spectroscopic notation.

14. The invention according to claim 13 wherein the wavelength of said fiber optic pumping source corresponds to the energy level difference between the higher useful and intermediate energy levels of said trivalent erbium ion.

15. The invention according to claim 13 wherein the wavelength of said fiber optic pumping source corresponds to the energy level difference between the intermediate and ground levels of said trivalent erbium ion.

16. The invention according to claim 2 wherein said rare earth ion is trivalent holmium, whose intermediate and ground levels, in spectroscopic notation, are the $^5I_7$ level and the $^5I_8$ level, respectively.

17. The invention according to claim 16 wherein the higher useful energy level of said trivalent holmium is the $^5S_2$ level, in spectroscopic notation.

18. The invention according to claim 16 wherein the higher useful energy level of said trivalent holmium is the $^5F_5$ level, in spectroscopic notation.

19. A quantum counter for use in detecting an infrared image and converting said signal to the region of the wavelength spectrum less than approximately 1.2 microns, comprising:

a source of pumping radiation;
a fiber optic device including a number of thin elongated glass cores each having one index of refraction and doped with first and second rare earth ions, each having a ground energy level, an intermediate energy level, and a at least one higher useful energy level, and energy level characteristics such that the wavelength of the input signal corresponds to an energy level difference of said first rare earth ion, and the wavelength of said pumping radiation corresponds to another energy level difference of said first rare earth ion, the selected energy level of said first rare earth ion corresponding to the selected useful energy level of said second rare earth ion for transferring energy to the selected useful energy level of said second rare earth ion; and, said cores being each surrounded by a cladding of glass of a lower index of refraction, means for applying the said infrared image to one end of said cores and means for applying said pumping radiation to said fiber device to cause a transition of said first rare earth ion to said selected useful energy level and a subsequent transfer of energy to the selected useful energy level of said second rare earth ion for subsequent transition to a lower level of said second rare earth ion, with attendant fluorescence in a region of the wavelength spectrum below approximately 1.2 microns, said fluorescence providing a visible image corresponding to said infrared image.

20. The invention according to claim 19 wherein said first rare earth ion is trivalent erbium and said second rare earth ion is trivalent ytterbium.

21. The invention according to claim 19 wherein said first rare earth ion is trivalent thulium and said second rare earth ion is trivalent gadolinium.

22. The invention according to claim 19 wherein said first rare earth ion is trivalent erbium and said second rare earth ion is trivalent gadolinium.

23. The invention according to claim 19 wherein said first rare earth ion is trivalent holmium and said second rare earth ion is trivalent gadolinium.

24. The invention according to claim 19 wherein said first rare earth ion is trivalent erbium and said second rare earth ion is trivalent europium.

25. The invention according to claim 24 wherein the higher useful energy level of said trivalent europium is the $^5D_0$ level, in spectroscopic notation.

26. The invention according to claim 24 wherein the higher useful energy level of said trivalent europium is the L level, in spectroscopic notation.

27. A quantum counter for detecting a signal input radiative in the region of the wavelength spectrum between approximately 1.0 and 2.8 microns and converting the signal to a representation in the region of the wavelength spectrum less than approximately 1.2 microns, comprising:

a source of pumping radiation;
a fiber optic device including a bundle of thin elongated glass cores arranged in a side-by-side parallel arrangement and each having one index of refraction and responsive to said pumping radiation and the signal input by producing fluorescence in the region of the wavelength spectrum below approximately 1.2 microns; said cores each being surrounded by a cladding of glass of a lower index of refraction, said bundle having parallel end faces;

means for applying said pumping radiation signal input to said fiber optic device; and means for applying said signal input to one end face of said bundle, and, a filter for separating said fluorescence from said pumping radiation and transmitting said fluorescence.

28. The invention according to claim 27 wherein the fluorescence transmitted by said filter is applied to a photo-emissive material, which produces a visual image in response thereto.

29. The invention according to claim 28 wherein a dichroic beam splitter is provided for applying the signal input and said pumping radiation to said fiber optic device and a lens is provided for focussing the signal input radiation onto said beam splitter and another lens is provided for focussing said fluorescence onto said filter.

References Cited
UNITED STATES PATENTS

| | | | |
|---|---|---|---|
| 2,097,275 | 10/1937 | Fischer | 331—94.5 X |
| 3,070,698 | 12/1962 | Bloembergen | 250—83.3 |
| 3,287,556 | 11/1966 | Good | 250—83.3 X |

OTHER REFERENCES

E. Snitzer: Neodymium Glass Optical Masers, Spring 1962 Optical Society of America Journal, vol. 52.

RALPH G. NILSON, *Primary Examiner.*

A. B. CROFT, *Assistant Examiner.*